United States Patent
Lee et al.

(10) Patent No.: US 10,952,107 B2
(45) Date of Patent: Mar. 16, 2021

(54) METHOD FOR PERFORMING RRC CONNECTION REESTABLISHMENT PROCESS AND APPARATUS SUPPORTING SAME

(71) Applicant: LG Electronics Inc., Seoul (KR)

(72) Inventors: Youngdae Lee, Seoul (KR); Bokyung Byun, Seoul (KR); Sangwook Han, Seoul (KR)

(73) Assignee: LG Electronics Inc., Seoul (KR)

( * ) Notice: Subject to any disclaimer, the term of this patent is extended or adjusted under 35 U.S.C. 154(b) by 10 days.

(21) Appl. No.: 16/338,029

(22) PCT Filed: Sep. 27, 2017

(86) PCT No.: PCT/KR2017/010724
§ 371 (c)(1),
(2) Date: Mar. 29, 2019

(87) PCT Pub. No.: WO2018/062848
PCT Pub. Date: Apr. 5, 2018

(65) Prior Publication Data
US 2019/0274074 A1    Sep. 5, 2019

Related U.S. Application Data

(60) Provisional application No. 62/401,910, filed on Sep. 30, 2016, provisional application No. 62/401,907, filed on Sep. 30, 2016.

(51) Int. Cl.
*H04W 56/00* (2009.01)
*H04W 36/00* (2009.01)
(Continued)

(52) U.S. Cl.
CPC ....... *H04W 36/0055* (2013.01); *H04W 36/08* (2013.01); *H04W 76/19* (2018.02); *H04W 76/27* (2018.02)

(58) Field of Classification Search
CPC . H04W 36/0055; H04W 76/19; H04W 76/27; H04W 36/08
(Continued)

(56) References Cited

U.S. PATENT DOCUMENTS 8,060,122 B2    11/2011  Tseng
2008/0299996 A1*  12/2008  Tseng .................... H04W 76/28
455/458

(Continued)

FOREIGN PATENT DOCUMENTS

KR    1020130009845    1/2013

OTHER PUBLICATIONS

Huawei et al., "RAN2 Impact of Context Fetch in Light Connection," R2-165249, 3GPP TSG RAN2 Meeting #95, Gothenburg, Sweden, Aug. 12, 2016, see sections 1-2.
(Continued)

*Primary Examiner* — Sai Ming Chan
(74) *Attorney, Agent, or Firm* — Dentons US LLP

(57) ABSTRACT

Provided is a method for a terminal performing an RRC connection reestablishment process in a wireless communication system. The method comprises the steps of: the terminal moving from a first base station to a second base station; transmitting, to the second base station, an RRC connection reestablishment request message; receiving, from the second base station, an RRC connection reestablishment message, wherein the RRC connection reestablishment message includes a state conversion indicator indicating an RRC state into which the terminal should enter; and entering the RRC state corresponding to the state conversion indicator.

3 Claims, 8 Drawing Sheets

(51) Int. Cl.
    *H04W 76/19*     (2018.01)
    *H04W 76/27*     (2018.01)
    *H04W 36/08*     (2009.01)

(58) Field of Classification Search
    USPC .......................................................... 370/331
    See application file for complete search history.

(56) References Cited

U.S. PATENT DOCUMENTS

| | | | | |
|---|---|---|---|---|
| 2013/0039287 | A1* | 2/2013 | Rayavarapu | H04W 76/28 370/329 |
| 2014/0018085 | A1* | 1/2014 | Young | H04W 76/28 455/450 |
| 2015/0071260 | A1* | 3/2015 | Chun | H04L 1/1854 370/336 |
| 2015/0079991 | A1* | 3/2015 | Koskinen | H04W 36/00837 455/436 |
| 2018/0139651 | A1* | 5/2018 | Kim | H04L 29/12 |
| 2019/0174571 | A1* | 6/2019 | Deenoo | H04W 36/30 |

OTHER PUBLICATIONS

LG Electronics, "General Considerations on Lightweight Connection," R2-165667, 3GPP TSG RAN2 Meeting #95, Gothenburg, Sweden, Aug. 13, 2016, see section 2.
Huawei et al, "General Consideration on Light Connection, "R3-160655, 3GPP TSG RAN WG3 Meeting #91bis, Bangalore, India, Apr. 1, 2016, see section 2.

* cited by examiner

METHOD FOR PERFORMING RRC CONNECTION REESTABLISHMENT PROCESS AND APPARATUS SUPPORTING SAME

CROSS-REFERENCE TO RELATED APPLICATIONS

This application is the National Stage filing under 35 U.S.C. 371 of International Application No. PCT/KR2017/010724, filed on Sep. 27, 2017, which claims the benefit of U.S. Provisional Applications No. 62/401,910 filed on Sep. 30, 2016, and No. 62/401,907 filed on Sep. 30, 2016, the contents of which are all hereby incorporated by reference herein in their entirety.

BACKGROUND OF THE INVENTION

Field of the Invention

The present invention relates to a method in which a terminal in an RRC_INACTIVE state performs a radio resource control (RRC) connection reestablishment procedure.

Related Art

Efforts have been made to develop an improved 5th-generation (5G) communication system or a pre-5G communication system in order to satisfy a growing demand on radio data traffic after commercialization of a 4th-generation (4G) communication system. A standardization act for a 5G mobile communication standard work has been formally started in 3GPP, and there is ongoing discussion in a standardization working group under a tentative name of a new radio access (NR).

In the discussion of NR standardization, an RRC_CONNECTED state and an RRC_IDLE state are defined by default as a radio resource control (RRC) state, and an RRC_INACTIVE state is additionally introduced. A user equipment (UE) in the RRC_INACTIVE state performs a radio control procedure similarly to the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state.

As such, there is ongoing discussion on the RRC_INACTIVE state. In particular, a method of performing an RRC connection reestablishment procedure in the UE in the RRC_INACTIVE state is actively carried out.

SUMMARY OF THE INVENTION

In E-UTRAN, a user equipment (UE) in an RRC_CONNECTED state cannot support a UE-based cell reselection procedure. However, the UE in the RRC_INACTIVE state may perform the cell reselection procedure. In this case, the UE needs to report UE location information to the E-UTRAN.

In addition, when the UE in the RRC_INACTIVE state moves between base stations (BSs) corresponding to different RAN-based paging regions, since a new serving BS cannot directly receive UE context from the existing BS, there is a need for discussion on a method for fetching the UE context.

Further, a method in which the UE enters a new RRC state through an instruction of the BS is considered.

According to an embodiment of the present invention, there is provided a method in which a terminal performs an RRC connection reestablishment in a wireless communication system. The method includes: moving the terminal from a first base station to a second base station; transmitting an RRC connection reestablishment request message to the second base station; receiving the RRC connection reestablishment message from the second base station, wherein the RRC connection reestablishment message includes a state transition indicator indicating an RRC state to which the terminal is to enter; and entering the RRC state corresponding to the state transition indicator.

The terminal may be in a lightweight connected state with respect to the first base station.

The state transition indicator may indicate any one of an RRC_CONNECTED state, an RRC_IDLE state, and an RRC_INACTIVE state.

If the state transition indicator indicates the RRC_CONNECTED state, the entering of the corresponding RRC state may be for entering the RRC_CONNECTED state by resuming a suspended signaling radio bearer (SRB).

If the state transition indicator indicates the RRC_IDLE state, the entering of the corresponding RRC state may be for entering the RRC_IDLE state by releasing the RRC connection.

If the state transition indicator indicates the RRC_INACTIVE state, the entering of the corresponding RRC state may be for entering the RRC_INACTIVE state by suspending an SRB and a data radio bearer (DRB).

The method may further include, before performing the transmitting of the RRC connection reestablishment request message, receiving system information including a cell ID corresponding to the second base station from the second base station; and determining whether the second base station belongs to the same paging region as the first base station on the basis of the cell ID.

The method may further include, if it is determined that the second base station belongs to a paging region different from that of the first base station, initiating an RAN-based paging region update procedure by the terminal.

If it is determined that the second base station belongs to a paging region different from that of the first base station, the transmitting of the RRC connection reestablishment request message may include transmitting an SAE temporary mobile subscriber identity (S-TMSI) to the second base station.

The paging region may be a region in which RAN-based paging is performed.

The second base station may belong to the same paging region as the first base station. The transmitting of the RRC connection reestablishment request message may include transmitting a cell-radio network temporary identifier (C-RNTI) to the second base station.

According to another embodiment of the present invention, there is provided a terminal performing an RRC connection reestablishment procedure in a wireless communication system. The terminal includes: a memory; a transceiver; and a processor operatively coupling the memory and the transceiver, wherein the processor is configured to: move the terminal from a first base station to a second base station; transmit an RRC connection reestablishment request message to the second base station; receive the RRC connection reestablishment message from the second base station, wherein the RRC connection reestablishment message includes a state transition indicator indicating an RRC state to which the terminal is to enter; and enter the RRC state corresponding to the state transition indicator.

The terminal may be in a lightweight connected state with respect to the first base station.

The state transition indicator may indicate any one of an RRC_CONNECTED state, an RRC_IDLE state, and an RRC_INACTIVE state.

If the state transition indicator indicates the RRC_CONNECTED state, the processor may resume a suspended SRB to enter the RRC_CONNECTED state.

According to embodiments of the present invention, when a user equipment (UE) in an RRC_INACTIVE state leaves the existing base station (BS) and enters a cell of a new BS, the UE may report a location thereof by transmitting an RRC connection reestablishment request message to the new BS, and the new BS may secure UE context through an X2 interface or an S2 interface. Further, the UE may enter a corresponding RRC state by receiving an indicator regarding the RRC state from the new BS.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G communication system is an evolution of the LTE-A.

For clarity, the following description will focus on LTE-A. However, technical features of the present invention are not limited thereto.

Figure 1:
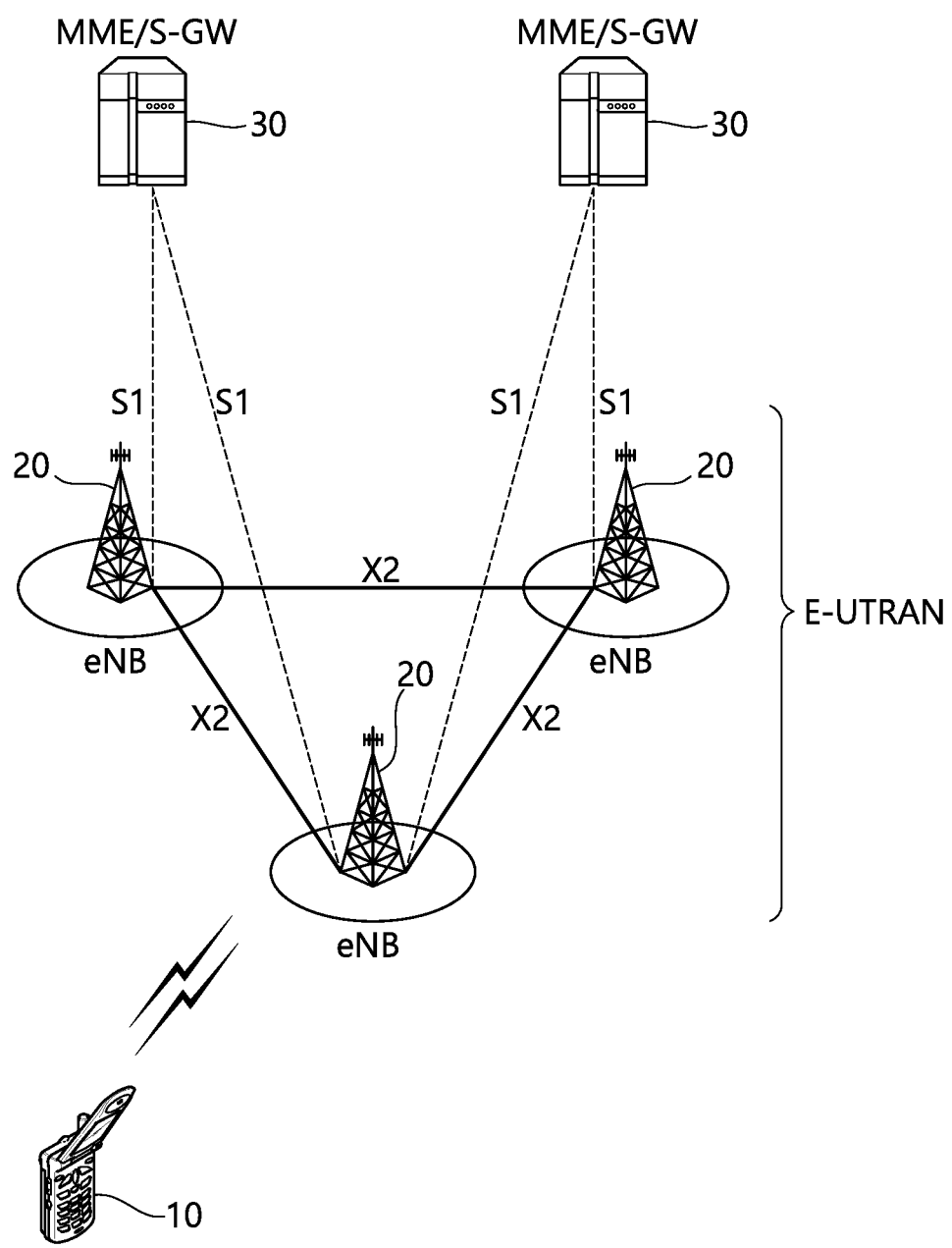
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
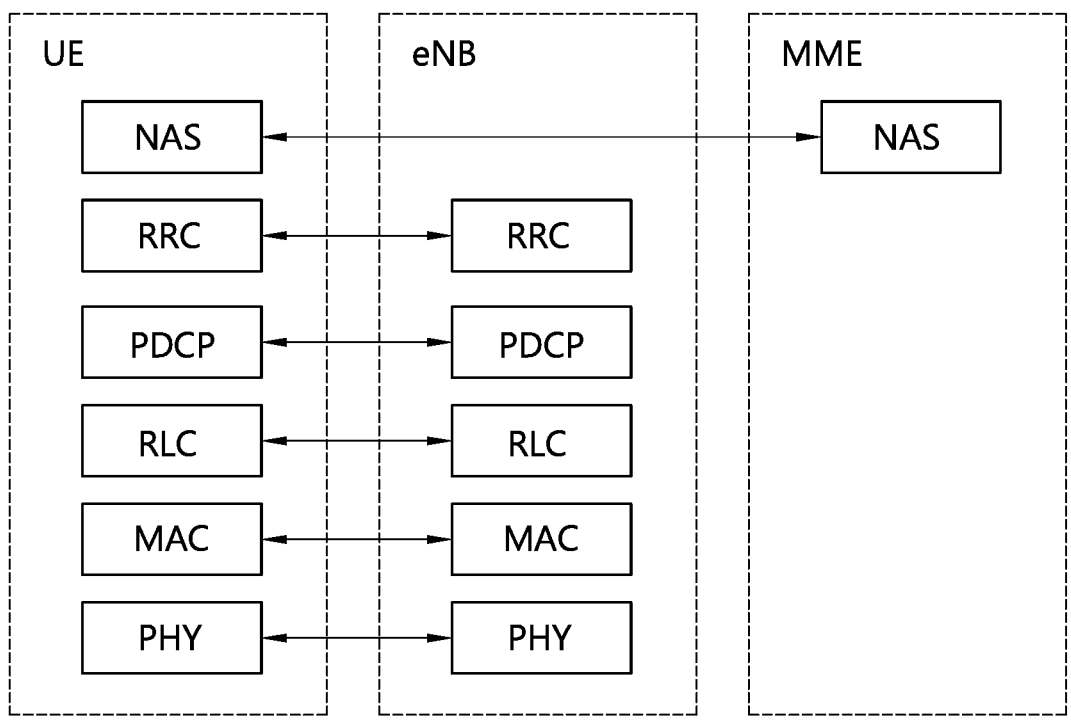
FIG. 2 shows a block diagram of a control plane protocol stack of an LTE system.
Figure 3:
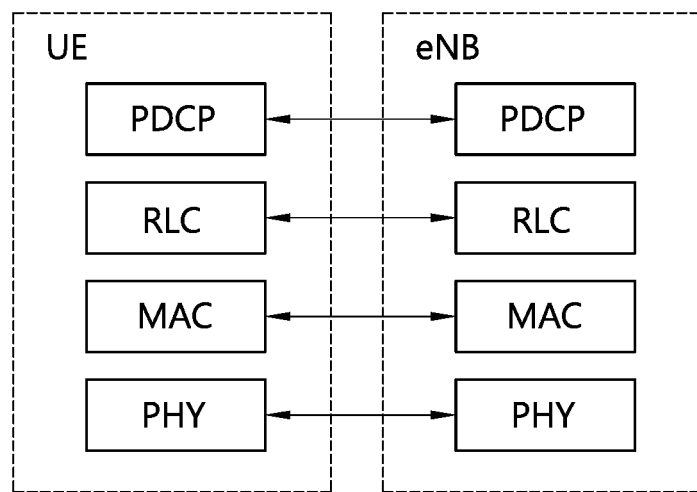
FIG. 3 shows a block diagram of a user plane protocol stack of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer belongs to an upper layer of the RRC layer and serves to perform session management, mobility management, or the like.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, RRC state of UE and RRC connection method is described below.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

In order to manage the mobility of the terminal in the NAS layer positioned on the control planes of the terminal and the MME, an EPS mobility management (EMM) registered state and an EMM deregistered state may be defined. The EMM registered state and the EMM deregistered state may be applied to the terminal and the MME. Like a case of turning on the power of the terminal for the first time, an initial terminal is in the EMM deregistered state and the terminal performs a process of registering the terminal in the corresponding network through an initial attach procedure in order to access the network. When the attach procedure is successfully performed, the terminal and the MME is transitioned to the EMM registered state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, a mobility of the UE is managed by the command of the network. If a location of the UE in the ECM-IDLE state becomes different from a location known to the network, the UE announces the location of the UE to the network through a tracking area update procedure.

Hereinafter, a 5G network structure is described.

Figure 4:
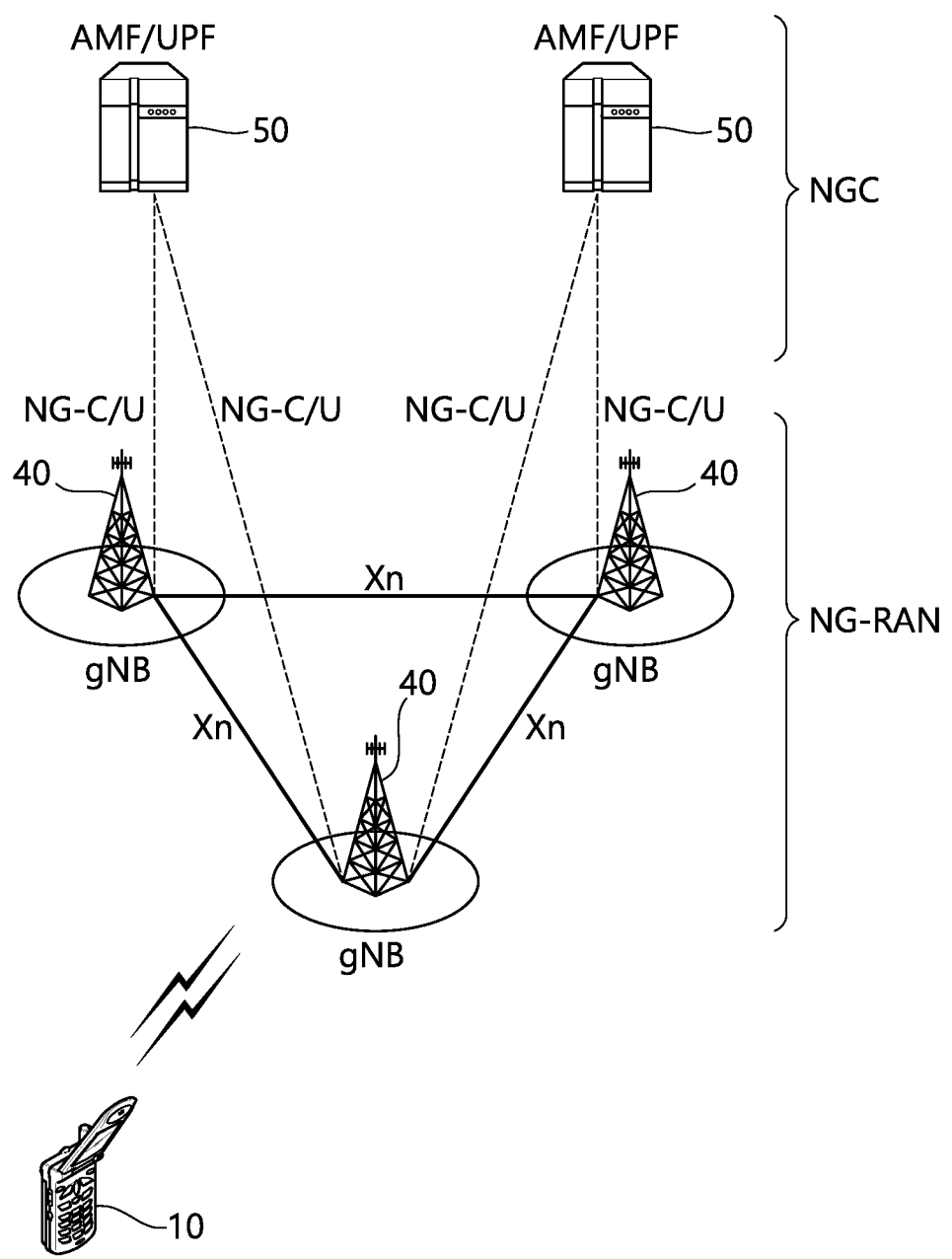
FIG. 4 shows a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NGC interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, an RRC_INACTIVE state of a UE is described.

In the discussion on the NR standardization, an RRC_INACTIVE state (RRC inactive state) has been newly introduced in addition to the existing RRC_CONNETED state and RRC_IDLE state. The RRC_INACTIVE state may be a concept similar to a lightly connected mode which is under discussion in LTE. The RRC_INACTIVE state is a state introduced to efficiently manage a specific UE (for example, mMTC UE). Meanwhile, the RRC_INACTIVE state may be referred as a lightly connected state or lightly connection. A UE in the RRC_INACTIVE state performs a radio control procedure similarly to a UE in the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state. In the RRC_INACTIVE state, a radio access resource is released, but wired access may be maintained. For example, in the RRC_INACTIVE state, the radio access resource is released, but an NG2 interface between a gNB and am NGC or an S1 interface between an eNB and an EPC may be maintained. In the RRC_INACTIVE state, a core network recognizes that the UE is normally connected to a BS. On the other hand, the BS may not perform connection management for the UE in RRC_INACTIVE state. The lightly connected state may be substantially considered as RRC_INACTIVE state.

Meanwhile, regarding a UE in a state where the core network is connected, a user plane path and a signaling path are established between an upper layer entity (e.g., an MME in LTE or a CP function in NR) and a BS (RAN of LTE or NR). In the absence of substantial data/signal transmission, the core network may remain in the connected state, and the UE enters an RRC_IDLE or RRC_INACTIVE state. Since the S1/NG2 connection to the UE is still maintained, the upper layer entity cannot know an actual RAN state of the UE.

An embodiment of the present invention provides a method of reporting location information of a UE to E-UTRAN so that the UE in an RRC_INACTIVE state performs a cell re-selection procedure. According to an embodiment, the UE may receive a paging message from a BS, and may initiate a procedure for recovering a connection state in which a link failure occurs. In addition, the UE may transmit a response for the paging message to the BS. Herein, the paging message is generated by the BS, and the paging may be RAN-based paging. In addition, the BS may generate the paging message when downlink data is available. Meanwhile, a procedure for recovering the connection state may be an RRC connection reestablishment procedure.

Figure 5:
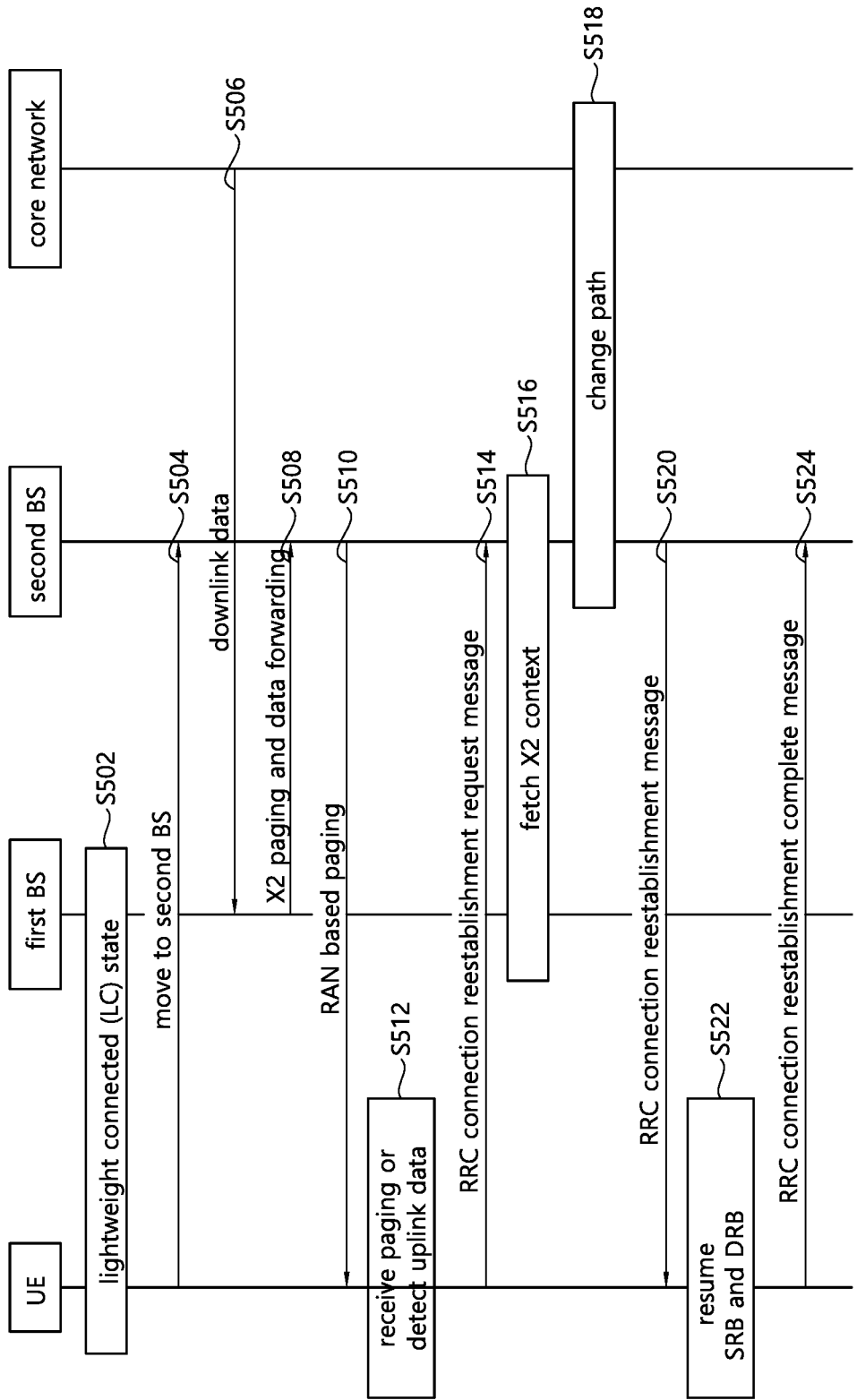
FIG. 5 is a flowchart for explaining an RRC connection reestablishment method according to an embodiment of the present invention.

FIG. 5 is a flowchart for explaining an RRC connection reestablishment method according to an embodiment of the present invention.

In step S502, a UE may be in an RRC_INACTIVE state with respect to a first BS. That is, the UE may be in a state where an NG interface between the first BS (gNB) and NGC or an S1 interface between the first BS (eNB) and EPC is maintained.

In step S504, the UE may move from the first BS and a second BS. That is, the UE may move from a coverage region of the first BS to a coverage region of the second BS. Herein, the second BS may correspond to the same RAN-based paging region as the first BS.

In step S506, when a core network (e.g., S-GW) detects data to be transmitted to the UE, the core network may transmit downlink data for the UE in the RRC_INACTIVE state to the first BS. However, since the UE is no longer present in a coverage region of the first BS, the first BS cannot transfer the downlink data directly to the UE.

In step S508, the first BS may generate a paging message, and may forward the downlink data to the second BS through X2 paging. In the present description, the first BS may be referred to as an anchor BS as a BS which forwards downlink data.

In step S510, the second BS may transmit an RAN-based paging message to the UE. As described above, the second BS may be a new serving BS after performing mobility of the UE.

In step S512, the UE may receive the paging message, or may detect uplink data or uplink signaling to be transmitted to the BS.

In step S514, upon receiving the paging message or detecting uplink data or uplink signaling, the UE may transmit an RRC connection reestablishment request message to the second BS, i.e., a serving BS. The UE may request for a radio link re-connection to the second BS through the RRC connection reestablishment request message. At least one of the following information may be included in the RRC connection reestablishment request message.

physCellID: physical cell ID of the first BS
   reestablishmentcause: add reestablishment cause ("updateinlightconnect")
   UE-identity: C-RNTI allocated by the first BS The UE may report a location thereof towards the E-UTRAN by transmitting the RRC connection reestablishment request message to the second BS in response to the paging message. Meanwhile, a reestablishment ID consisting of the physCellID and UE-identity in the RRC connection reestablishment request message may be used in an 'X2 context fetch' in the step described below. The reestablishment ID may include information regarding the first BS. In addition, the RRC connection reestablishment request message may include a new reestablishment cause for initiating the RRC connection reestablishment, and the reestablishment cause may indicate that there is an update item related to a lightweight connected state.

In step S516, the second BS may fetch information on UE context from the first BS. According to an embodiment, the UE context may be fetched from the first BS to the second BS through an X2 context fetch. As described above, the first BS and the second BS belong to the same RAN-based paging region, and thus may exchange the UE context through an X2 interface.

In step S518, when the X2 context fetch is successfully performed, a path switch may be performed. That is, the second BS may report to a core network that there is a change in a serving cell of the UE by using the UE context.

In step S520, the second BS may transmit to the UE an RRC connection reestablishment message indicating that an RRC connection reestablishment request of the UE is accepted.

In step S522, the UE may resume a signaling radio bearer (SRB) and a data radio bearer (DRB) which are suspended when an RRC connection reestablishment message is received from the second BS.

In step S524, after a procedure based on the received RRC connection reestablishment message is normally performed, the UE may transmit an RRC connection reestablishment complete message to the second BS. In other words, after resuming the SRB and the DRB, the UE may transmit the RRC connection reestablishment complete message to the second BS.

Meanwhile, when the second BS is a BS corresponding to an RAN-based paging region different from that of the first BS, the second BS cannot fetch UE context through the aforementioned method. Hereinafter, a method in which a new serving BS of the UE fetches the UE context will be described when the UE moves between BSs corresponding to different RAN-based paging regions.

According to the present embodiment, the BS may receive one of IMSI and s-TMSI through an RRC message received from a UE in an ECM_CONNECTED state. The ECM_CONNECTED state implies a state in which a signaling connection capable of transferring a NAS message is established between the UE and MME. Specifically, the UE may be in an RRC_CONNECTED state or an RRC_INACTIVE state. In addition, the BS may be an eNB in E-UTRAN. In addition, the RRC message may be an RRC connection reestablishment request message or an RRC connection resume request message.

Thereafter, the BS may request a core network to provide UE context corresponding to the IMSI or S-TMSI. Herein, the UE context may include at least one of security information and UE capability. In addition, the core network may be MME.

Thereafter, the BS may receive the UE context from the core network.

An embodiment of the present invention proposes an S1 context fetch using S-TMSI of a UE in an RRC_INACTIVE state when the UE performs an update procedure regarding the RAN-based paging region.

In the present embodiment, an RRC connection reestablishment procedure may be replaced with an RRC connection resume procedure. Accordingly, an RRC connection reestablishment request message may be replaced with an RRC connection resume request message. In addition, an RRC connection reestablishment message may be replaced with an RRC connection resume message. In addition, an RRC connection reestablishment complete message may be replaced with an RRC connection resume complete message.

Figure 6:
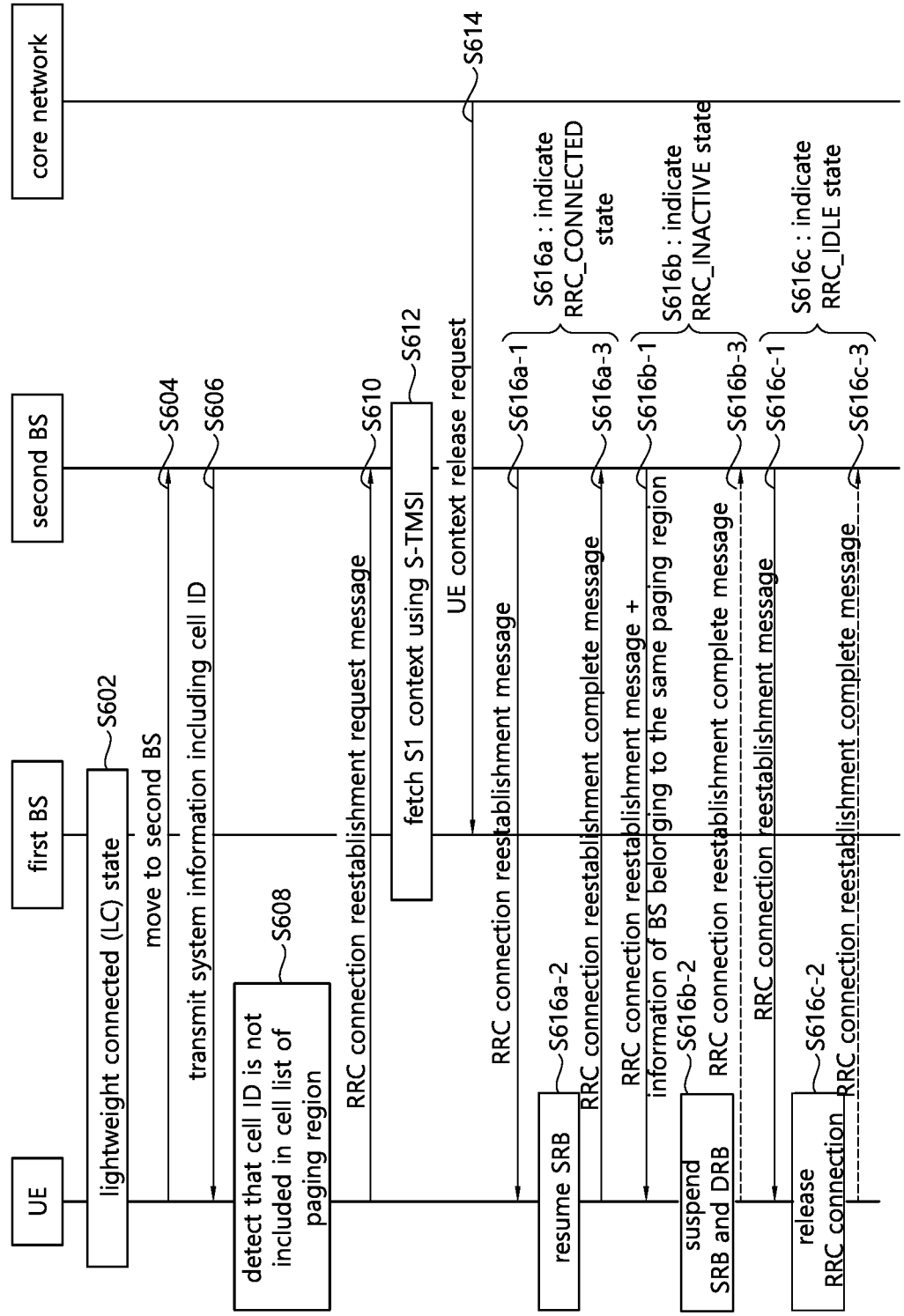
FIG. 6 is a flowchart for explaining an RRC connection reestablishment method according to an embodiment of the present invention.

FIG. 6 is a flowchart for explaining an RRC connection reestablishment method according to an embodiment of the present invention.

In step S602, a UE may be in an RRC_INACTIVE state with respect to a first BS. That is, the UE may be in a state where an NG interface between the first BS (gNB) and NGC or an S1 interface between the first BS (eNB) and EPC is maintained.

In step S604, the UE in the RRC_INACTIVE state may perform a UE-based mobility operation from the first BS to a second BS as in a cell re-selection mechanism in an RRC_IDLE state. According to an embodiment, the second BS may have an RAN-based paging region distinguished from the first BS. In other words, the UE may leave the old RAN-based paging region and move to the second BS.

In step S606, the UE may receive system information from the second BS. The system information may include a cell ID of the second BS, an ID of the RAN-base paging region, or the like.

In step S608, the UE may determine whether the second BS is out of the old RAN-based paging region. Specifically, the UE may determine whether the second BS belongs to the same paging region as the first BS by using the system information.

In step S610, upon detecting that the second BS is out of the old RAN-based paging region, the UE may initiate the RRC connection reestablishment procedure. That is, the UE may transmit an RRC connection reestablishment request message to the second BS. The RRC connection reestablishment request message may include at least one of the following information.

physCellID: physical cell ID of the first BS
reestablishmentcause: add reestablishment cause ("updateinlightconnect")
S-TMSI: C-RNTI allocated by the first BS According to the present embodiment, as a UE identity, S-TMSI may be used instead of C-RNTI. In addition, the UE may report a location thereof towards E-UTRAN by transmitting an RRC connection reestablishment request message to the second BS. Meanwhile, a reestablishment ID and S-TMSI in the RRC connection reestablishment request message may be used in an 'S1 context fetch'. The reestablishment ID may include information regarding the first BS. In addition, the RRC connection reestablishment request message may include a new reestablishment cause for initiating the RRC connection reestablishment, and the reestablishment cause may indicate that there is an update item related to a lightweight connected state.

In step S612, the UE may update the RAN-based paging region. Specifically, since the UE is out of the old RAN-based paging region, the UE may update the RAN-based paging region and thus may report to a network that the UE is out of the old RAN-based paging region. In this case, there is a need to perform a procedure capable of fetching UE context from the first BS to the second BS. According to an embodiment, the UE context may be fetched from the first BS to the second BS through the S1 context fetch. That is, since the RAN-based paging region is different between the first BS and the second BS, the second BS cannot fetch the UE context directly from the first BS through an X2 interface. Accordingly, the second BS may request a core network to provide the UE context through the S1 interface. Specifically, the second BS may request the core network to fetch the UE context, and thus the core network may retrieve the UE context from the first BS. In addition, the core network may transfer the UE context to the second BS.

In step S614, when the S1 context fetch procedure is successfully performed, the core network may transmit a UE context release request to the first BS. Accordingly, the first BS may release the stored UE-related context.

In step S616, the second BS may transmit to the UE an RRC connection reestablishment message indicating that the RRC connection reestablishment request of the UE is accepted. In the present procedure, the second BS may indicate to which state the UE is to enter. In order for the second BS to allow the UE to enter a specific state, an additional state transition indicator shall be included in the RRC connection reestablishment message. A step in which the second BS instructs the UE to transition to a specific state may be performed as shown in one of the following methods.

Step S616a is related to a method of instructing the UE to enter the RRC_CONNECTED state.

In step S616a-1, when the second BS detects downlink data or downlink signals to be transmitted to the UE which performs an update procedure of the RAN-based paging region, the second BS may transmit to the UE a state transition indicator instructing the UE to enter the RRC_CONNECTED state.

In step S616a-2, when the UE receives an RRC connection reestablishment message including the state transition indicator instructing the UE to enter the RRC_CONNECTED state, the UE may resume SRB.

In step S616a-3, when a procedure depending on reception of the RRC connection reestablishment message is normally performed, the UE may transmit an RRC connection reestablishment complete message to the second BS. That is, after the SRB is resumed, the UE may transmit an RRC connection reestablishment complete message to the second BS.

Step S616b is related to a method of instructing the UE to enter the RRC_INACTIVE state.

In step S616b-1, when the second BS desires that the UE maintains the same state (RRC_INACTIVE state) as a current state, the second BS may transmit to the UE a state transition indicator indicating to remain in the RRC_INACTIVE state and information regarding a BS existing in the same RAN-based paging region as the second BS.

In step S616b-2, the UE in the RRC_INACTIVE state may still remain in the RRC_INACTIVE state, and the RRC connection of the UE may be suspended.

In step S616b-3, the UE may transmit the RRC connection reestablishment complete message, but the RRC connection reestablishment complete message is not necessarily transmitted to the second BS for fast transition.

Step S616-c is related to a method of instructing the UE to enter the RRC_IDLE state.

In step S616c-1, when the second BS deals with a traffic overload, a state transition indicator instructing the UE to enter the RRC_IDLE state may be transmitted to the UE.

In step S616c-2, for fast transition, the UE may release the RRC connection and may implicitly allow to enter the RRC_IDLE state. In this case, the UE may not additionally transmit the RRC connection reestablishment complete message to the second BS.

Figure 7:
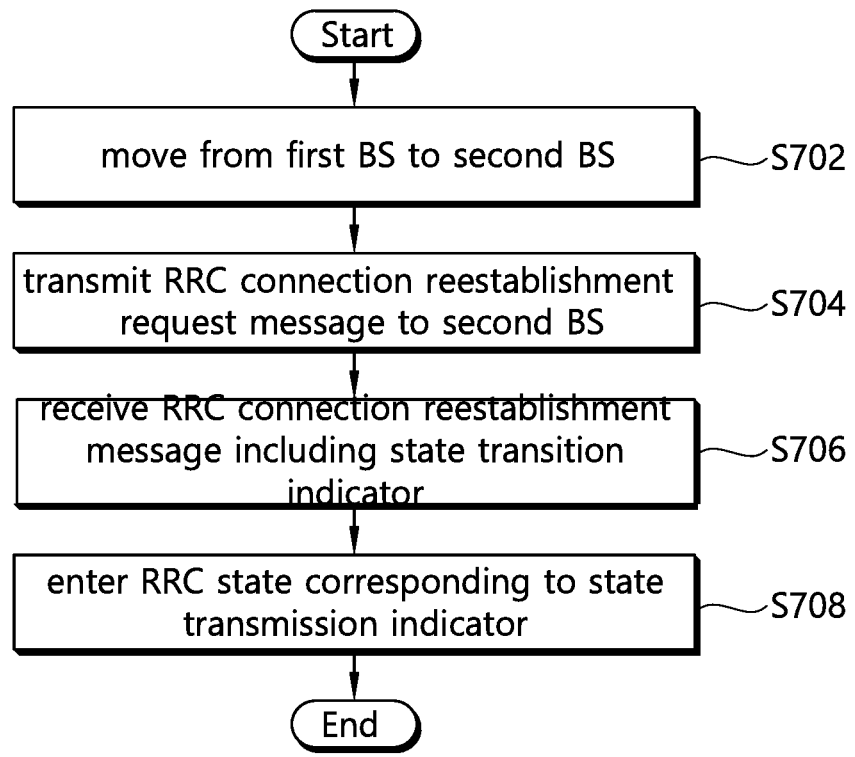
FIG. 7 is a flowchart for explaining an RRC connection reestablishment method of a UE according to an embodiment of the present invention.

FIG. 7 is a flowchart for explaining an RRC connection reestablishment method of a UE according to an embodiment of the present invention.

In step S702, the UE may move from a first BS to a second BS. Herein, the UE may be in a lightweight connected mode.

In step S704, the UE may transmit an RRC connection reestablishment request message to the second BS. The RRC connection reestablishment request message may include a cell ID of the first BS, a reestablishment cause including update information of a connection state, and a UE ID.

According to an embodiment, before performing the transmitting of the RRC connection reestablishment request message, the terminal may receive receiving system information including a cell ID corresponding to the second base station from the second base station, and determine whether the second base station belongs to the same paging region as the first base station on the basis of the cell ID. If it is determined that the second base station belongs to a paging region different from that of the first base station, the terminal may initiate an RAN-based paging region update procedure by the terminal. In addition, if it is determined that the second base station belongs to a paging region different from that of the first base station, the terminal may transmit an SAE temporary mobile subscriber identity (S-TMSI) to the second base station. Herein, the paging region may be a region in which RAN-based paging is performed. Meanwhile, if the second base station belongs to the same paging region as the first base station, the terminal may transmit a cell-radio network temporary identifier (C-RNTI) to the second base station.

In step S706, the terminal may receive an RRC connection reestablishment message from the second base station. In addition, the RRC connection reestablishment message may include a state transition indicator indicating an RRC state to which the terminal is to enter. According to an embodiment, the state transition indicator may indicate any one of an RRC_CONNECTED state, an RRC_IDLE state, and an RRC_INACTIVE state.

In step S708, the terminal may enter an RRC state corresponding to the state transition indicator. If the state transition indicator indicates the RRC_CONNECTED state, in the entering of the corresponding RRC state, the terminal may enter the RRC_CONNECTED state by resuming a suspended signaling radio bearer (SRB). In addition, if the state transition indicator indicates the RRC_IDLE state, in the entering of the corresponding RRC state, the terminal may enter the RRC_IDLE state by releasing the RRC connection. In addition, if the state transition indicator indicates the RRC_INACTIVE state, in the entering of the corresponding RRC state, the terminal may enter the RRC_INACTIVE state by suspending an SRB and a data radio bearer (DRB).

Figure 8:
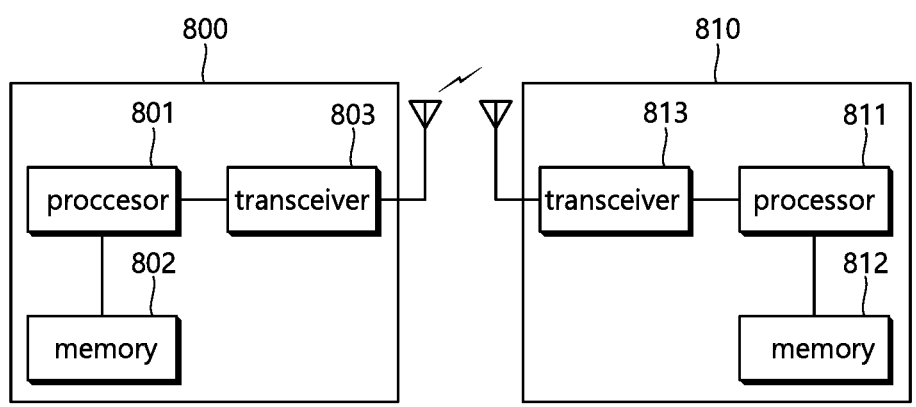
FIG. 8 is a block diagram illustrating a wireless apparatus in which an embodiment of the present invention can be implemented.

FIG. 8 is a block diagram illustrating a wireless apparatus in which an embodiment of the present invention can be implemented.

A BS 800 includes a processor 801, a memory 802, and a transceiver 803. The memory 802 is coupled to the processor 801, and stores a variety of information for driving the processor 801. The transceiver 803 is coupled to the processor 801, and transmits and/or receives a radio signal. The processor 801 implements the proposed functions, procedures, and/or methods. In the aforementioned embodiments, an operation of the BS may be implemented by the processor 801.

A UE 810 includes a processor 811, a memory 812, and a transceiver 813. The memory 812 is coupled to the processor 811, and stores a variety of information for driving the processor 811. The transceiver 813 is coupled to the processor 811, and transmits and/or receives a radio signal. The processor 61 implements the proposed functions, procedures, and/or methods. In the aforementioned embodiments, an operation of the UE 810 may be implemented by the processor 811.

The processors 811 may include application-specific integrated circuit (ASIC), other chipset, logic circuit and/or data processing device. The memories may include read-only memory (ROM), random access memory (RAM), flash memory, memory card, storage medium and/or other storage device. The transceivers may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for performing, by a user equipment (UE), a radio resource control (RRC) connection reestablishment in a wireless communication system, wherein the UE is in a lightweight connected state with respect to a first base station, the method comprising:
    moving the UE from the first base station to a second base station;
    receiving, from the second base station, system information including a cell ID of the second base station;
    upon determining that the second base station does not belong to the same paging region as the first base station based on the received cell ID of the second base station, transmitting, to the second base station, an RRC connection reestablishment request message including (i) a cell ID of the first base station, (ii) a reestablishment cause, and (iii) an SAE temporary mobile subscriber identity (S-TMSI) of the UE allocated by the first base station;
    upon determining that the second base station belongs to the same paging region as the first base station based on the received cell ID of the second base station, transmitting, to the second base station, an RRC connection reestablishment request message including (i) a cell ID of the first base station, (ii) a reestablishment cause, and (iii) a cell-radio network temporary identifier (C-RNTI) of the UE allocated by the first base station;
    receiving, from the second base station, an RRC connection reestablishment message including a state transition indicator in response to the RRC connection reestablishment message, wherein the state transition indicator indicates an RRC state to which the UE is to enter; and
    based on the state transition indicator indicating the RRC_CONNECTED state:
        entering the RRC_CONNECTED state by resuming a suspended signaling radio bearer (SRB),
    based on the state transition indicator indicating the RRC_IDLE state:
        entering the RRC_IDLE state by releasing the RRC connection,
    based on the state transition indicator indicating the RRC_INACTIVE state:
        entering the RRC_INACTIVE state by suspending an SRB and a data radio bearer (DRB),
        wherein the paging region is a region in which RAN-based paging is performed.

2. The method of claim 1, further comprising:
    upon determining that the second base station belongs to a paging region different from a paging region of the first base station, initiating an RAN-based paging region update procedure by the UE.

3. A user equipment (UE) performing a radio resource control (RRC) connection reestablishment procedure in a wireless communication system, wherein the UE is in a lightweight connected state with respect to a first base station, the UE comprising:
    a memory; a transceiver; and a processor operatively coupling the memory and the transceiver, wherein the processor is configured to:
        move the UE from the first base station to a second base station;
        control the transceiver to receive, from the second base station, system information including a cell ID of the second base station;
        upon determining that the second base station does not belong to the same paging region as the first base station based on the received cell ID of the second base station, control the transceiver to transmit, to the second base station, an RRC connection reestablishment request message including (i) a cell ID of the first base station, (ii) reestablishment cause, and (iii) an SAE temporary mobile subscriber identity (S-TMSI) of the UE allocated by the first base station;
        upon determining that the second base station belongs to the same paging region as the first base station based on the received cell ID of the second base station, transmitting, to the second base station, an RRC connection reestablishment request message including (i) a cell ID of the first base station, (ii) a reestablishment cause, and (iii) a cell-radio network temporary identifier (C-RNTI) of the UE allocated by the first base station;
        control the transceiver to receive, from the second base station, an RRC connection reestablishment message including a state transition indicator in response to the RRC connection reestablishment message, wherein the state transition indicator indicates an RRC state to which the UE is to enter; and
    based on the state transition indicator indicating the RRC_CONNECTED state:
        enter the RRC_CONNECTED state by resuming a suspended signaling radio bearer (SRB),
    based on the state transition indicator indicating the RRC_IDLE state:
        enter the RRC_IDLE state by releasing the RRC connection, based on the state transition indicator indicating the RRC_INACTIVE state:
  enter the RRC_INACTIVE state by suspending an SRB and a data radio bearer (DRB),
  wherein the paging region is a region in which RAN-based paging is performed.

\* \* \* \* \*